US012807467B2

(12) United States Patent
McNamara

(10) Patent No.: US 12,807,467 B2
(45) Date of Patent: Nov. 24, 2026

(54) AXIALLY ALIGNED TANDEM PENETRATOR FOR A CORKSCREW

(71) Applicant: Christopher J. McNamara, Glenside, PA (US)

(72) Inventor: Christopher J. McNamara, Glenside, PA (US)

(*) Notice: Subject to any disclaimer, the term of this patent is extended or adjusted under 35 U.S.C. 154(b) by 319 days.

(21) Appl. No.: 18/744,829

(22) Filed: Jun. 17, 2024

(65) Prior Publication Data

US 2025/0382167 A1 Dec. 18, 2025

(51) Int. Cl.
*B67B 7/04* (2006.01)

(52) U.S. Cl.
CPC .......... *B67B 7/0423* (2013.01); *B67B 7/0447* (2013.01)

(58) Field of Classification Search
CPC ........ B67B 7/04; B67B 7/0447; B67B 7/0423
See application file for complete search history.

(56) References Cited

U.S. PATENT DOCUMENTS

| | | | | |
|---|---|---|---|---|
| 179,090 | A | 6/1876 | Barnes | |
| 301,425 | A * | 7/1884 | Bayles | B67B 7/04 222/91 |
| 5,031,486 | A | 7/1991 | Rydgren | |

FOREIGN PATENT DOCUMENTS

| | | | |
|---|---|---|---|
| DE | 98 | C | 7/1877 |
| DE | 938167 | C | 1/1956 |
| EP | 0321708 | A1 | 6/1989 |
| GB | 191007916 | A | 12/1910 |
| GB | 218869 | A | 7/1924 |
| GB | 661220 | A | 11/1951 |

* cited by examiner

*Primary Examiner* — Carlos A. Rivera
(74) *Attorney, Agent, or Firm* — Michael Crilly, Esquire

(57) ABSTRACT

An axially aligned tandem penetrator for a corkscrew for removing a cork from a neck of a bottle and a method of use are presented. The tandem penetrator includes a front penetrator and a rear penetrator. The front penetrator includes a shaft with a helical ridge. The rear penetrator includes a helical coil with first and second ends. The front penetrator extends at the first end. The second end is secured to a mechanism enabling use of the tandem penetrator. The penetrators are aligned along a rotational axis through the mechanism. The tandem penetrator and the mechanism cooperate to avoid lateral movement by the front penetrator relative to the cork as the front penetrator enters the cork. The front penetrator forms a primary penetration cavity. The rear penetrator forms a secondary penetration cavity. The cavities are interconnected so that the tandem penetrator resides within both cavities before removing the cork.

21 Claims, 10 Drawing Sheets

AXIALLY ALIGNED TANDEM PENETRATOR FOR A CORKSCREW

REFERENCE TO RELATED APPLICATIONS

None.

FEDERALLY SPONSORED RESEARCH AND DEVELOPMENT

None.

FIELD OF THE INVENTION

The disclosure generally relates to a mechanical device for manually removing a cork from a bottle, and more specifically an axially aligned tandem penetrator for a corkscrew wherein a paired arrangement of penetrators cooperate to mitigate lateral movement as a front penetrator initially enters a cork and to minimize penetration resistance as the front penetrator and a rear penetrator bore into the cork.

BACKGROUND OF THE INVENTION

Corkscrews are typically configured to include a coil attached to a handle with or without leveraging means.

FIG. 1 shows a corkscrew 1 including a coil 2 secured to a shank 3 and the shank 3 secured to a handle 4. The coil 2 further includes a tip 5 which is typically sharpened or tapered so as to penetrate a cork 6 disposed within the neck 7 of a bottle 8. Corkscrews 1 with these or similar features are problematic in that the coil 2 is prone to lateral movement 9 at contact with the cork 6 as the coil 2 initially penetrates, that is rotatingly enters, the body of the cork 6 adjacent the top of the neck 7. The lateral movement 9 is often difficult to control thus allowing the coil 2 to penetrate the cork 6 at an angle and/or off center. The knock-on effects are improper alignment and/or improper location of the coil 2 with respect to the cork 6 and the inner diameter of the neck 7 thereby permitting the coil 2 to damage the cork 6 within the neck 7 and/or complicating removal of the cork 6 from the neck 7. In some instances, the lateral movement 9 during entry may cause the tip 5 to slide off the cork 6 thereafter contacting the user and causing physical injury thereto. When the latter occurs in a restaurant setting, the server is prone to great embarrassment and the diners' experience is compromised.

FIG. 2 shows a corkscrew 1 from U.K. Patent No. GB661,220 by Topping wherein a coil 2 at one end is secured to a handle 4 and the coil 2 at another end includes a projection in the form of a coiled extension 2*a*. The coiled extension 2*a* exacerbates penetration resistance which is an inherently problematic aspect of helical-type corkscrews. In some instances, the penetration resistance may be sufficient to frustrate operability of a corkscrew.

Therefore, what is required is a penetrator for use with a corkscrew which avoids the lateral movement problem yet maintains operability of the corkscrew.

SUMMARY OF THE INVENTION

An object of the disclosure is a penetrator for use with a corkscrew which avoids the lateral movement problem yet maintains operability of the corkscrew.

In accordance with embodiments of an axially aligned tandem penetrator for a corkscrew capable of manually removing a cork from a neck of a bottle, the axially aligned tandem penetrator includes a front penetrator and a rear penetrator. The front penetrator includes a shaft with a shaft diameter and a helical ridge disposed about and outwardly extending from the shaft. The rear penetrator includes a helical coil with an inner diameter and an outer diameter. The helical coil has a first end and a second end. The front penetrator extends at the first end. The second end is adapted to secure the rear penetrator to a mechanism enabling operability of the axially aligned tandem penetrator. The front penetrator and the rear penetrator are aligned along a rotational axis passing through the mechanism. The axially aligned tandem penetrator and the mechanism cooperate to avoid lateral movement by the front penetrator relative to the cork when the front penetrator enters the cork in use as the axially aligned tandem penetrator is rotated about the rotational axis. The front penetrator forms a primary penetration cavity into the cork in use as the axially aligned tandem penetrator is rotated about the rotational axis. The rear penetrator forms a secondary penetration cavity into the cork in use as the axially aligned tandem penetrator is rotated about the rotational axis. The primary penetration cavity is formed in part without the secondary penetration cavity and in part concurrently with the secondary penetration cavity. The primary penetration cavity is deeper than the secondary penetration cavity. The secondary penetration cavity is wider than the primary penetration cavity. The primary penetration cavity and the secondary penetration cavity are interconnected so that the axially aligned tandem penetrator in use resides within each of the primary penetration cavity and the secondary penetration cavity before the cork is removed from the neck In accordance with other embodiments, the rear penetrator is secured directly to the mechanism.

In accordance with other embodiments, the rear penetrator is secured indirectly to the mechanism via a shank.

In accordance with other embodiments, the secondary penetration cavity is formed by the rear penetrator widening the primary penetration cavity and the secondary penetration cavity is cylindrically shaped with a helical groove extending outward therefrom.

In accordance with other embodiments, the secondary penetration cavity is formed about the primary penetration cavity, a portion of the cork adjacent the helical coil partially separates the primary penetration cavity and the secondary penetration cavity, the primary penetration cavity formed by the shaft is cylindrically shaped, and the secondary penetration cavity is helically shaped.

In accordance with other embodiments, the portion is displaced toward the primary penetration cavity by the rear penetrator.

In accordance with other embodiments, the primary penetration cavity is narrowed by the portion.

In accordance with other embodiments, an extraction force at the mechanism is communicated to the cork at contact between the helical ridge and the cork within the primary penetration cavity and at contact between the helical coil and the cork within the secondary penetration cavity.

In accordance with other embodiments, the outer diameter is larger than the shaft diameter.

In accordance with other embodiments, the outer diameter and the inner diameter are larger than the shaft diameter.

In accordance with other embodiments, at least one of the front penetrator or the rear penetrator includes an outer layer which reduces sliding friction at contact with the cork.

In accordance with other embodiments, the mechanism is a handle.

In accordance with other embodiments, the mechanism includes a handle and a pair of arms.

In accordance with other embodiments, the mechanism is a handle with the axially aligned tandem penetrator rotatably secured to the handle adjacent a lever.

In accordance with methods of use of an axially aligned tandem penetrator secured to a mechanism enabling the axially aligned tandem penetrator to extract a cork from a neck of a bottle, the methods include the steps of entering the cork via a front penetrator of the axially aligned tandem penetrator, forming a primary penetration cavity within the cork via the front penetrator, widening the primary penetration cavity to form a secondary penetration cavity within the cork via a rear penetrator of the axially aligned tandem penetrator, applying an extraction force to the mechanism, and communicating the extraction force from the mechanism to the cork. In the entering step, the axially aligned tandem penetrator and the mechanism cooperate to avoid lateral movement by the front penetrator relative to the cork as the axially aligned tandem penetrator is rotated via the mechanism about a rotational axis passing through the mechanism. In the forming step, the primary penetration cavity is formed as the axially aligned tandem penetrator is rotated via the mechanism about the rotational axis and the front penetrator includes a shaft with a helical ridge extending outward from the shaft. In the widening step, the primary penetration cavity is widened as the axially aligned tandem penetrator is rotated via the mechanism about the rotational axis and the rear penetrator is a helical coil. In the communicating step, the extraction force is communicated to the cork at contact between the helical ridge and the cork within the primary penetration cavity and at contact between the helical coil and the cork within the secondary penetration cavity. The primary penetration cavity is formed in part without the secondary penetration cavity and in part concurrently with the secondary penetration cavity. The rear penetrator and the front penetrator are attached end-to-end and axially extend along the rotational axis. The secondary penetration cavity is cylindrically shaped with a helical groove extending outward therefrom. The primary penetration cavity and the secondary penetration cavity are interconnected so that the axially aligned tandem penetrator in use resides within each of the primary penetration cavity and the secondary penetration cavity before the cork is extracted from the neck.

In accordance with other methods, the cork disposed about the primary penetration cavity is compressed outwardly by the rear penetrator to form the helical groove in the widening step.

In accordance with other methods, the cork disposed about the primary penetration cavity is displaced outwardly by the rear penetrator to form the helical groove in the widening step.

In accordance with other methods, the cork disposed about the primary penetration cavity is penetrated by the rear penetrator to form the helical groove in the widening step.

In accordance with other methods of use of an axially aligned tandem penetrator secured to a mechanism enabling the axially aligned tandem penetrator to extract a cork from a neck of a bottle, the methods include the steps of entering the cork via a front penetrator of the axially aligned tandem penetrator, forming a primary penetration cavity within the cork via the front penetrator, forming a secondary penetration cavity into the cork via a rear penetrator of the axially aligned tandem penetrator, applying an extraction force to the mechanism, and communicating the extraction force from the mechanism to the cork. In the entering step, the axially aligned tandem penetrator and the mechanism cooperate to avoid a lateral movement by the front penetrator relative to the cork as the axially aligned tandem penetrator is rotated via the mechanism about a rotational axis passing through the mechanism. In the forming step, the primary penetration cavity is formed as the axially aligned tandem penetrator is rotated via the mechanism about the rotational axis and the front penetrator includes a shaft with a helical ridge extending outward from the shaft. In the second forming step, the primary penetration cavity is formed as the axially aligned tandem penetrator is rotated via the mechanism about the rotational axis and the rear penetrator is a helical coil. The primary penetration cavity is formed in part without the secondary penetration cavity and in part concurrently with the secondary penetration cavity. The rear penetrator is attached to and extends from the front penetrator along the rotational axis. The rear penetrator and the front penetrator are attached end-to-end and axially extend along the rotational axis. The secondary penetration cavity is helically shaped. A portion of the cork adjacent the helical coil is disposed between the primary penetration cavity and the secondary penetration. The primary penetration cavity and the secondary penetration cavity are interconnected so that the axially aligned tandem penetrator resides within each of the primary penetration cavity and the secondary penetration cavity before the cork is extracted from the neck. In the communicating step, the extraction force is communicated to the cork at contact between the helical ridge and the cork within the primary penetration cavity and at contact between the helical coil and the cork within the secondary penetration cavity.

In accordance with other methods, the methods further include the step of displacing the portion toward the primary penetration cavity by the rear penetrator during the forming step of the secondary penetration cavity.

In accordance with other methods, the methods further include the step of narrowing the primary penetration cavity adjacent the secondary penetration cavity during the forming step of the secondary penetration cavity.

One or more advantages may be offered by at least one embodiment of the disclosure in addition to or instead of other advantage(s) either explicitly or implicitly provided herein. In one aspect, the disclosure avoids contact between the penetrating part of a corkscrew and the neck of a bottle when removing a cork from the bottle. In another aspect, the disclosure avoids lateral movement when initially penetrating a cork within a bottle without unduly increasing penetration resistance.

BRIEF DESCRIPTION OF THE DRAWINGS

Additional aspects, features, and advantages of the disclosure will be understood and will become more readily apparent when the disclosure is considered in light of the following description made in conjunction with the accompanying drawings.

FIG. **6*a*** is an enlarged, partial cross-section view illustrating a corkscrew with an axially aligned tandem penetrator wherein a front penetrator resides within a primary penetration cavity formed by the front penetrator within a cork, a rear penetrator resides within a secondary penetration cavity formed by the rear penetrator within the cork, and the secondary penetration cavity includes a portion of the primary penetration cavity in accordance with an embodiment of the disclosure.

FIG. **6*b*** is an enlarged, partial cross-section view illustrating a corkscrew with an axially aligned tandem penetrator wherein a front penetrator resides within a primary penetration cavity formed by the front penetrator within a cork, a rear penetrator resides within a secondary penetration cavity formed by the rear penetrator within the cork, and the secondary penetration cavity extends into the cork about a portion of the primary penetration cavity in accordance with an embodiment of the disclosure.

Figure 7:
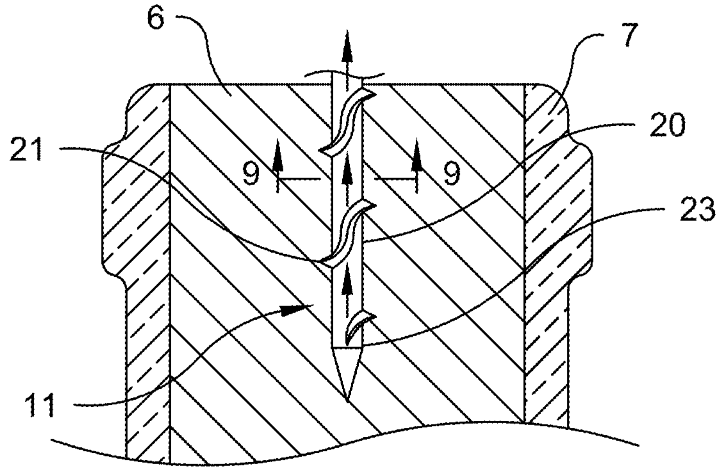

FIG. 7 is an enlarged, partial cross-section view illustrating a front penetrator of an axially aligned tandem penetrator wherein the front penetrator communicates an extraction force imposed at a mechanism onto a cork at contact between a helical ridge of the front penetrator and the cork within a primary penetration cavity in accordance with an embodiment of the disclosure.

FIG. **8*a*** is an enlarged, partial cross-section view illustrating a rear penetrator of an axially aligned tandem penetrator wherein the rear penetrator communicates an extraction force imposed at a mechanism onto a cork at contact between a helical coil of the rear penetrator and the cork within a secondary penetration cavity aligned along a primary penetration cavity in accordance with an embodiment of the disclosure.

FIG. **8*b*** is an enlarged, partial cross-section view illustrating a rear penetrator of an axially aligned tandem penetrator wherein the rear penetrator communicates an extraction force imposed at a mechanism onto a cork at contact between a helical coil of the rear penetrator and the cork within a secondary penetration cavity disposed about a primary penetration cavity in accordance with an embodiment of the disclosure.

Figure 9:
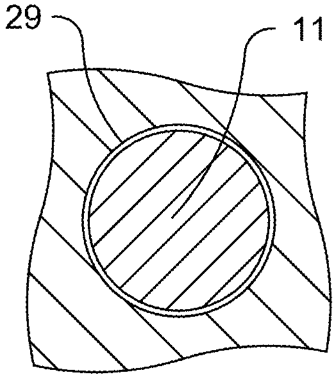

FIG. 9 is a cross-section view illustrating an outer layer of a front penetrator in accordance with an embodiment of the invention.

Figure 10:
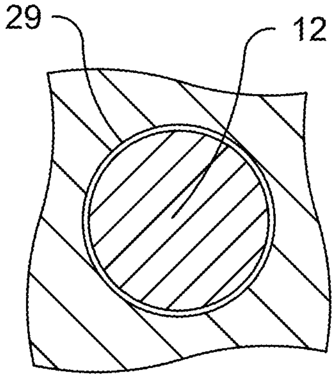

FIG. 10 is a cross-section view illustrating an outer layer of a rear penetrator in accordance with an embodiment of the invention.

Figure 11:
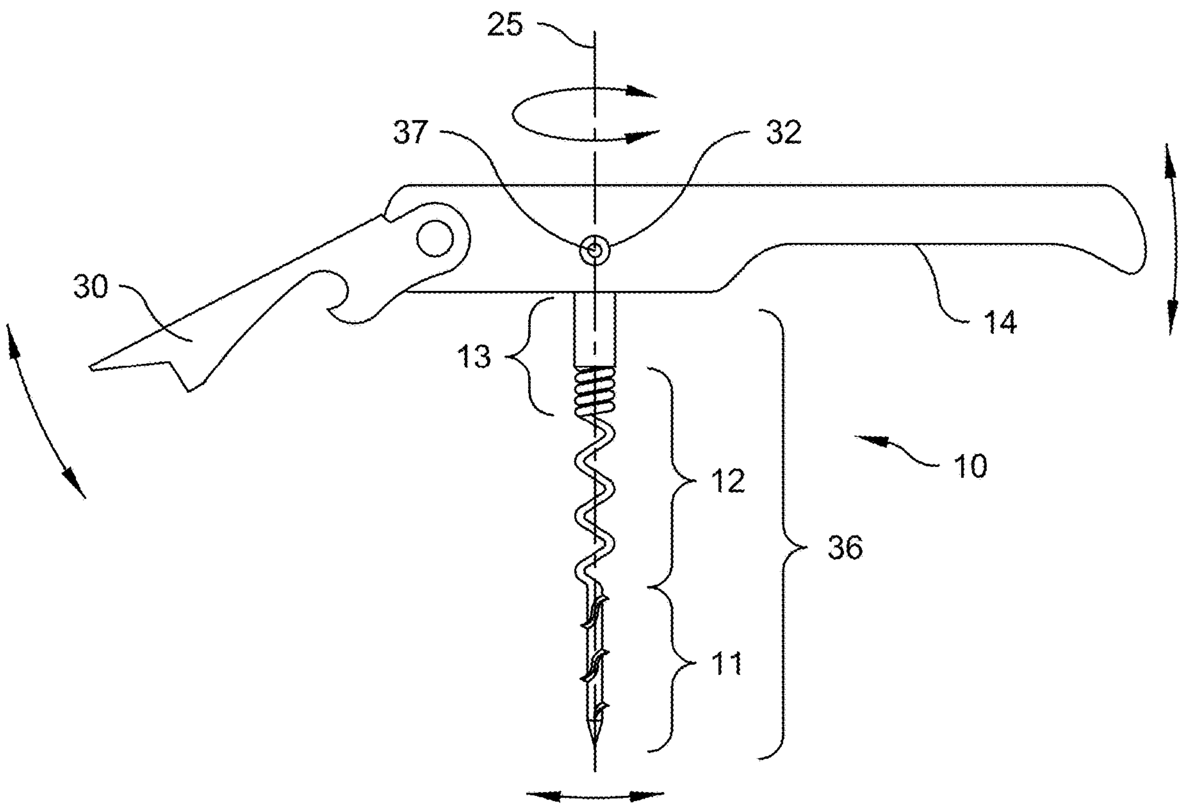

FIG. 11 is a side view illustrating a corkscrew wherein an axially aligned tandem penetrator including a front penetrator, a rear penetrator, and an optional shank is rotatably secured to a mechanism in the form of a handle with an optional rotatable lever secured to the mechanism adjacent the axially aligned tandem penetrator in accordance with an embodiment of the invention.

Figure 12:
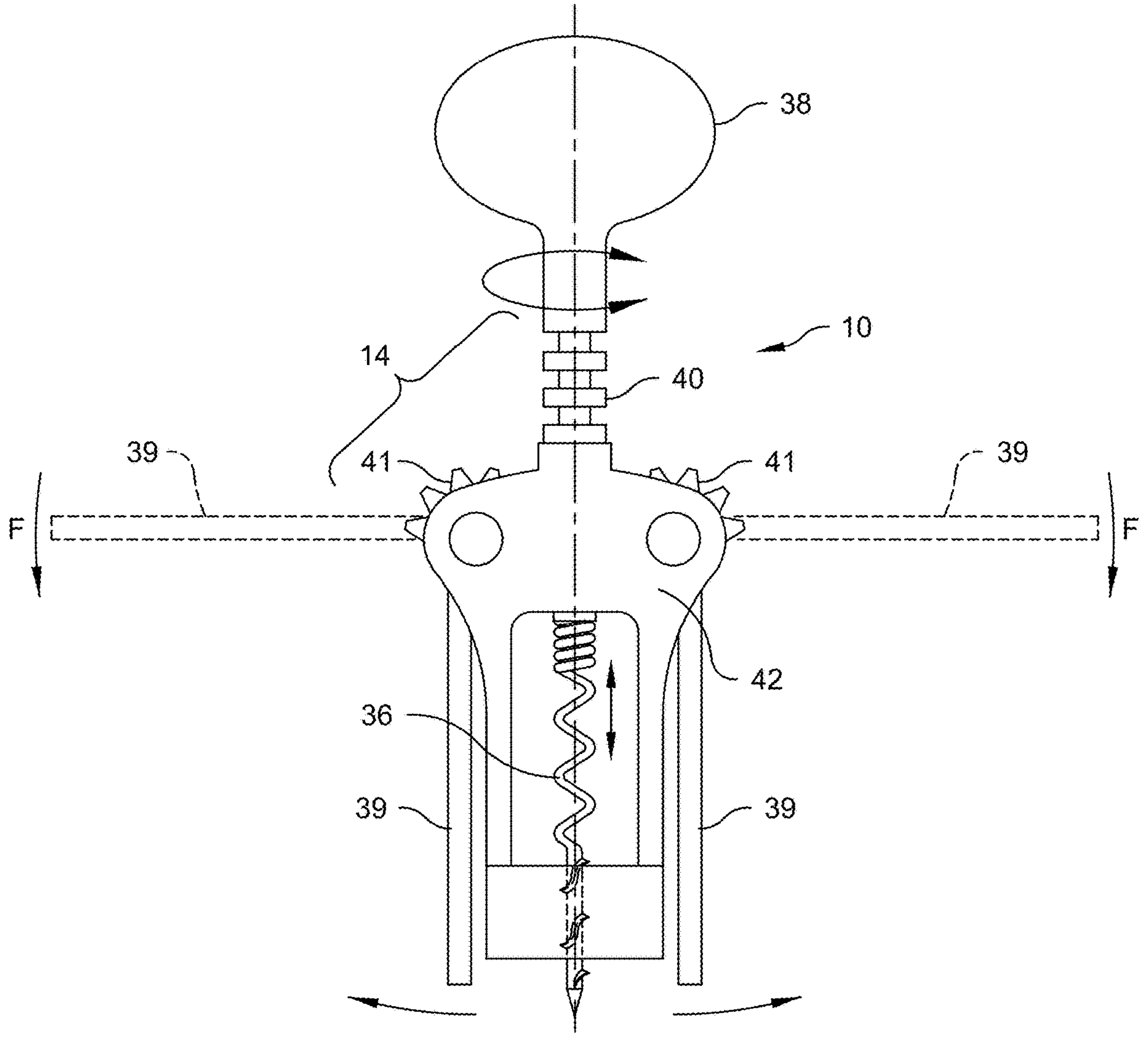

FIG. 12 is a side view illustrating a corkscrew wherein an axially aligned tandem penetrator including a front penetrator, a rear penetrator, and an optional shank is movably secured to a mechanism in the form of a body with operable handle and operable arms in accordance with an embodiment of the invention.

DETAILED DESCRIPTION

Reference will now be made in detail to several embodiments of the disclosure that are illustrated in the accompanying drawings. Wherever possible, same or similar reference numerals are used in the drawings and the description to refer to the same or like parts.

While features of various embodiments are separately described herein, it is understood that such features may be combinable to support other additional embodiments.

Components described herein may be composed of one or more suitable materials.

Components described herein may be manufactured via methods, processes, and techniques understood in the art, including, but not limited to, machining, molding, forming, or three-dimensional printing.

The drawing figures are not necessarily drawn to scale, but instead are drawn to provide a better understanding of the components thereof, and are not intended to be limiting in scope, but to provide exemplary illustrations.

Figure 3:
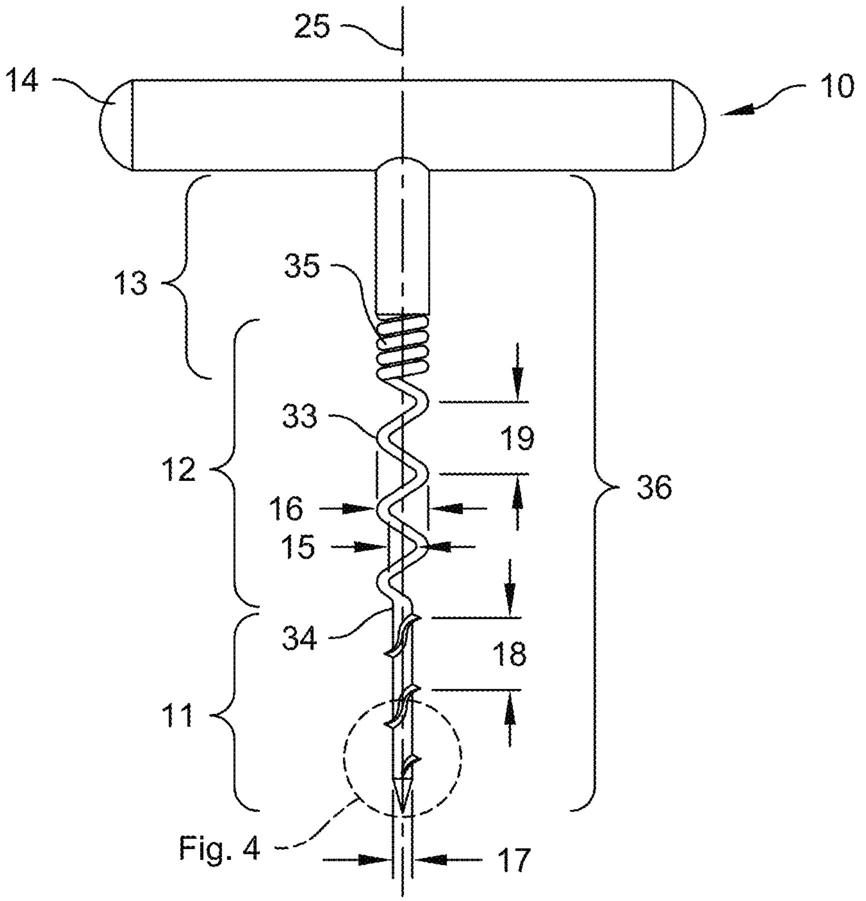
FIG. 3 is a side view illustrating a corkscrew with an axially aligned tandem penetrator including a front penetrator, a rear penetrator, and an optional shank in accordance with an embodiment of the disclosure.
Figure 4:
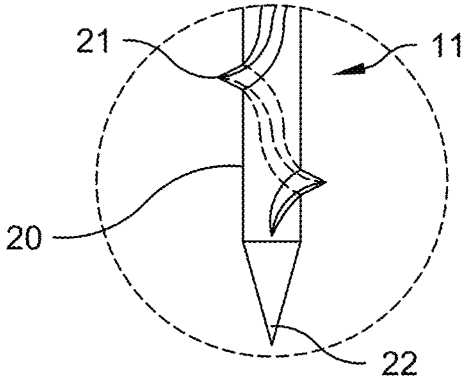
FIG. 4 is an enlarged side view illustrating a front penetrator of an axially aligned tandem penetrator wherein the front penetrator includes a shaft and a helical ridge disposed about and extending outward from the shaft in accordance with an embodiment of the disclosure.

Referring now to FIGS. 3 and 4, an axially aligned tandem penetrator 36 for a corkscrew 10 is shown including a front penetrator 11, a rear penetrator 12, and an optional shank 13. The front penetrator 11 has a shaft 20 with a shaft diameter 17 and a helical ridge 21 which extends outward from the shaft 20 at the shaft diameter 17. The helical ridge 21 may be a part of the shaft 20 or attached to the outer surface of the shaft 20. In preferred embodiments, the shaft diameter 17 is uniform as illustrated by the non-limiting example in FIG. 4. In other embodiments, the shaft diameter 17 may vary along the length of the front penetrator 11. In one non-limiting example, the shaft 20 may be tapered so that the shaft diameter 17 is smaller at the forward end of the shaft 20 and larger at the rearward end of the shaft 20. The front penetrator 11 also has a tip 22, preferably shaped to permit initial entry into a cork and to secure contact between the front penetrator 11 and a cork. The shaft 20 may be solid or hollow in part or whole. The rear penetrator 12 includes a helical coil 33 bounded by a first end 34 and a second end 35. The rear penetrator 12 has an inner diameter 15 and an outer diameter 16 wherein one half of the difference generally defines the thickness of the helical coil 33. In preferred embodiments, the inner diameter 15 and the outer diameter 16 are uniform as illustrated by the non-limiting examples in FIGS. **6*a* and 6*b*. In other embodiments, the inner diameter 15 and/or the outer diameter 16 may vary along the length of the rear penetrator 12. In one non-limiting example, the rear penetrator 12 may be tapered so that the inner diameter 15 and/or the outer diameter 16 is smaller at the forward end of the rear penetrator 12 and larger at the rearward end of the rear penetrator 12. Whether the outer diameter 16 or the inner diameter 15 extends or does not extend beyond the shaft diameter 17 or the helical ridge 21, when the rear penetrator 12 is tapered, may be relative to a minimum, a maximum, an average, or a value of the outer diameter 16 or the inner diameter 15**.

Referring again to FIG. 3, the front penetrator 11 is fixed to and extends from the rear penetrator 12 at the first end 34. The front penetrator 11 and the rear penetrator 12 are arranged lengthwise so as to be axially aligned. In preferred embodiments, the front penetrator 11 and the rear penetrator 12 are aligned end-to-end along a rotational axis 25 which passes through the center or the central axis of each of the front penetrator 11 and the rear penetrator 12 and also through a mechanism 14. The mechanism 14 may be in the form of a handle such as shown by the non-limiting example in FIG. 3, or a wine key such as shown by the non-limiting example in FIG. 11, or a cork extractor such as shown by the non-limiting example in FIG. 12, or other device suitable for enabling operability of the axially aligned tandem penetrator 36.

Referring again to FIG. 3, the axially aligned tandem penetrator 36 may be indirectly secured to the mechanism 14 via a shank 13. In these embodiments, the rear penetrator 12 is secured to the shank 13 at the second end 35 via means understood in the art. The shank 13 may be either secured to the mechanism 14 via means understood in the art or may be a part of the mechanism 14 via means understood in the art.

Figure 1:
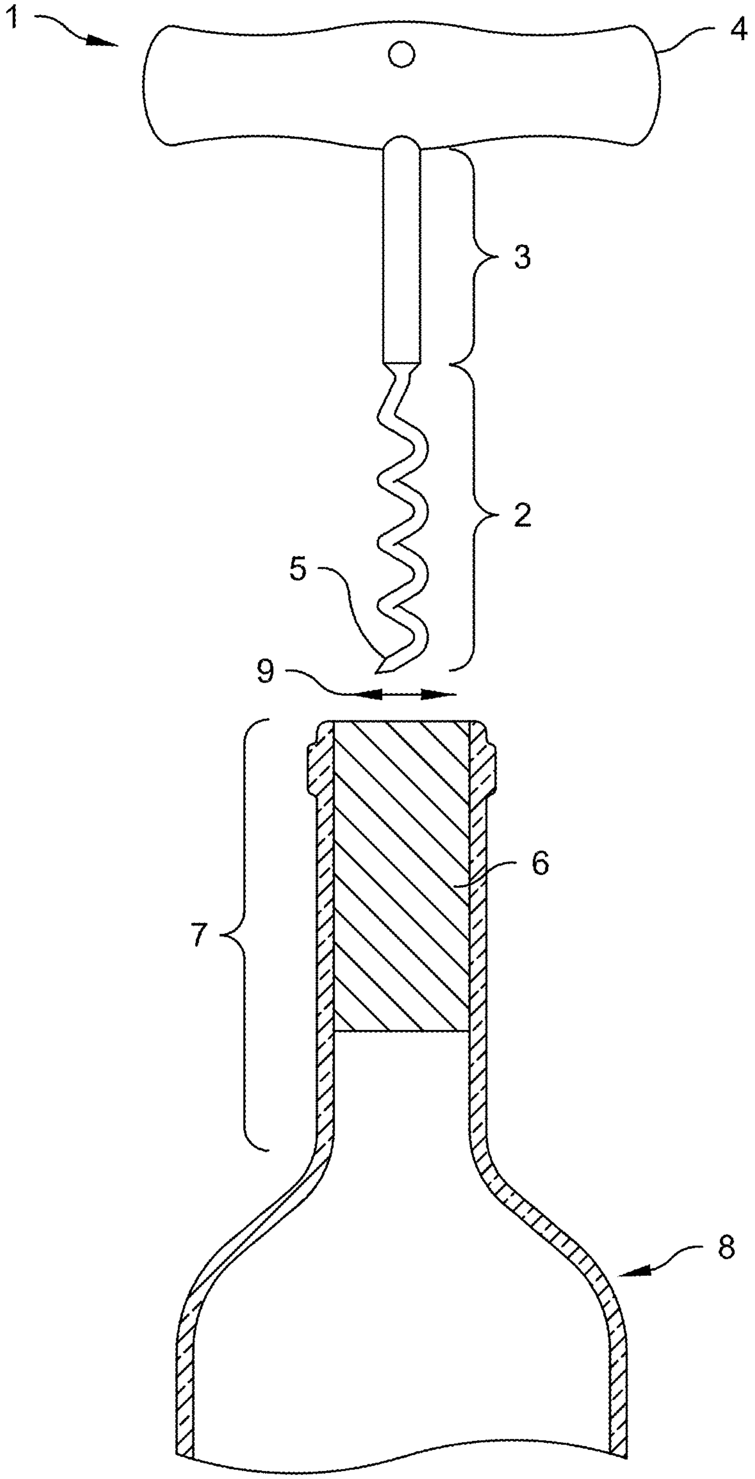
Fig. 1 (Prior Art)
FIG. 1 is a partial cross-section view of a corkscrew from the prior art with a coil indirectly attached to a handle via a shank.
Figure 2:
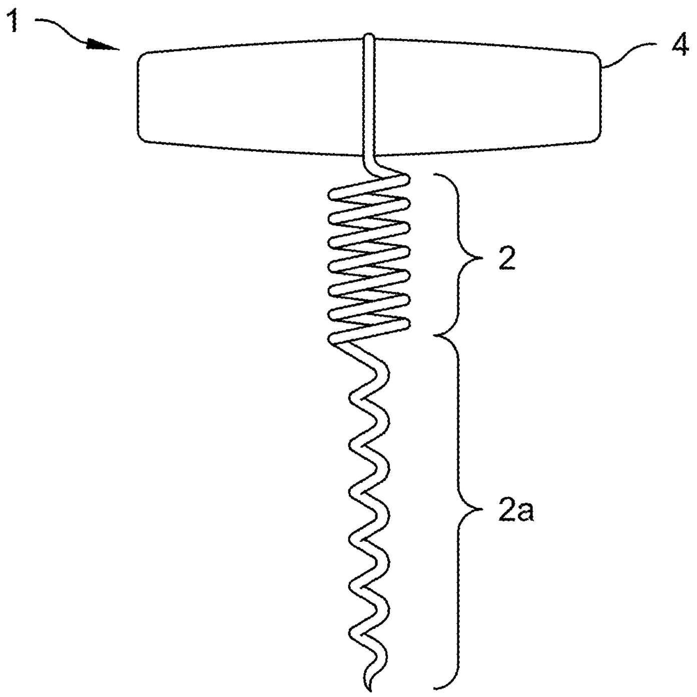
Fig. 2 (Prior Art)
FIG. 2 is a side view of a corkscrew from the prior art with a coil including a coiled extension wherein the coil is directly attached to a handle.

Referring again to FIG. 3, the axially aligned tandem penetrator 36 may be directly secured to the mechanism 14. In these embodiments, the rear penetrator 12 is either secured at the second end 35 to the mechanism 14 via means understood in the art, one non-limiting example being that shown in FIG. 2, or a part of the mechanism 14 via means understood in the art.

Referring again to FIG. 3, the outer diameter 16 is preferred to be larger than the shaft diameter 17 so that the rear penetrator 12 extends outward beyond the shaft 20 of the front penetrator 11. The outer diameter 16 may or may not extend beyond the helical ridge 21; however, the outer diameter 16 extends beyond the helical ridge 21 in preferred embodiments. The inner diameter 15 may or may not extend beyond the helical ridge 21. In some embodiments, the inner diameter 15 may be smaller than the shaft diameter 17. In other embodiments, the inner diameter 15 may be equal to the shaft diameter 17. In yet other embodiments, the inner diameter 15 may be larger than the shaft diameter 17. Whether the outer diameter 16 or the inner diameter 15 extends or does not extend beyond the shaft diameter 17 or the helical ridge 21, when the shaft 20 is tapered, may be relative to a minimum, a maximum, an average, or a value of the shaft diameter 17.

Referring again to FIG. 3, the helical ridge 21 and the helical coil 33 are preferred to be oriented in the same direction, either helically clockwise or helically counter-clockwise, so as to consecutively bore into a cork when the axially aligned tandem penetrator 36 is rotated in use by the mechanism 14. The pitch 18 of the helical ridge 21 and the pitch 19 of the helical coil 33 may be the same or different. In preferred embodiments, the pitch 18 and the pitch 19 allow the front penetrator 11 and the rear penetrator 12, respectively, to bore into a cork at the same rate.

Figure 5:
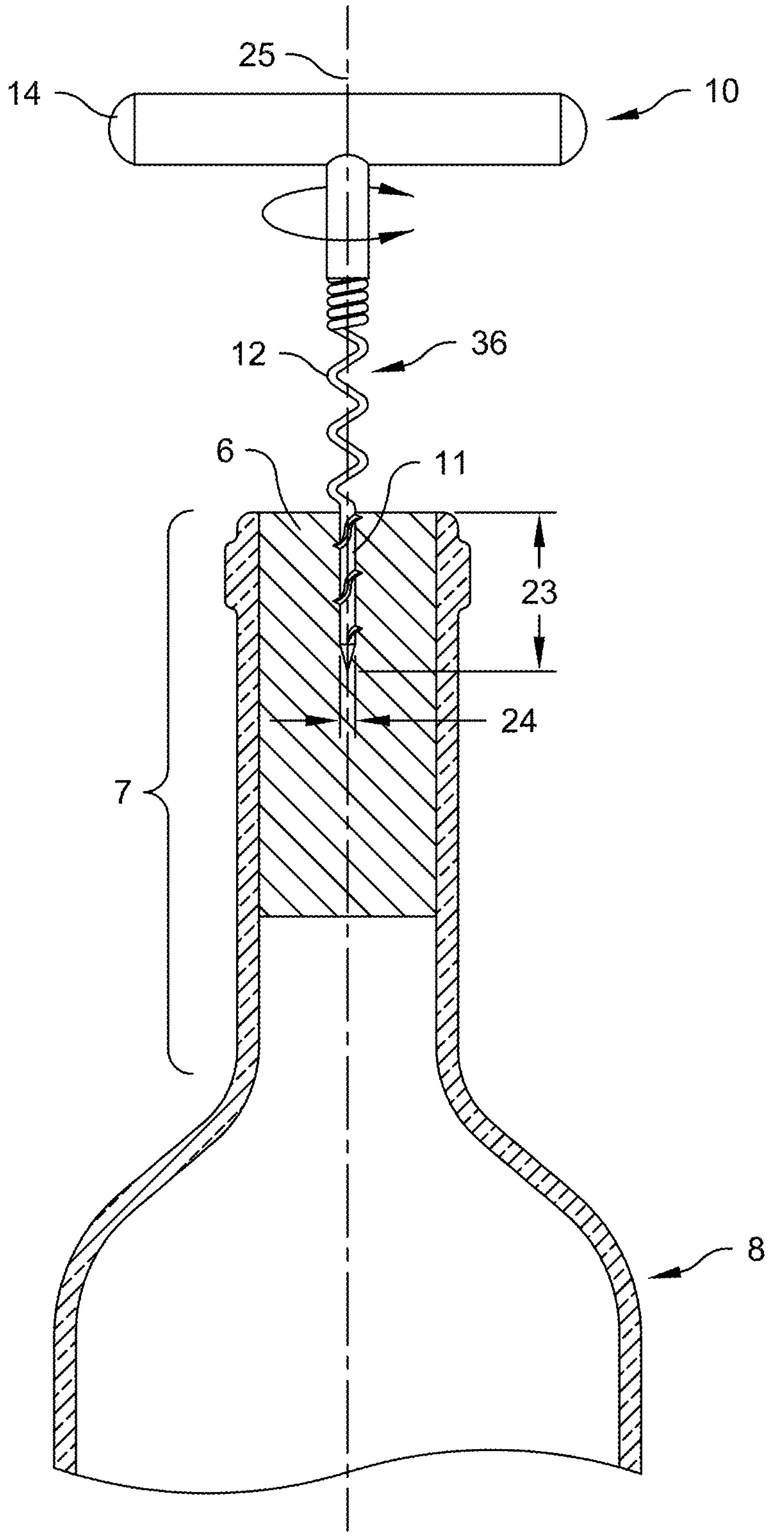
FIG. 5 is an enlarged, partial cross-section view illustrating a corkscrew with an axially aligned tandem penetrator wherein a front penetrator resides within a primary penetration cavity formed by the front penetrator within a cork and prior to formation of a secondary penetration cavity by a rear penetrator in accordance with an embodiment of the disclosure.

Referring now to FIGS. 5 and 4, the front penetrator 11 enters and bores into a cork 6 as the axially aligned tandem penetrator 36 is rotated about the rotational axis 25 via the mechanism 14 of the corkscrew 10. The front penetrator 11 initially penetrates the cork 6 without penetration by the rear penetrator 12. The axially aligned tandem penetrator 36 and the mechanism 14 cooperate during entry to maintain the rotational axis 25 at the point of contact between the front penetrator 11 and the cork 6, thereby avoiding lateral movement by the front penetrator 11 with respect to the cork 6. In preferred embodiments, the axially aligned tandem penetrator 36 and the mechanism 14 cooperate during entry to control the location and the angular orientation of the axially aligned tandem penetrator 36 with respect to the cork 6 so as to avoid contact with the neck 7 of the bottle 8. Preferably, the location is equidistant from the inner diameter of the neck 7 and the angular orientation is perpendicular to the top of the cork 6.

Referring again to FIGS. 5 and 4, the shaft 20 of the front penetrator 11 displaces, compresses, or penetrates a portion of the cork 6 as the helical ridge 21 interacts with the cork 6. In some embodiments, the helical ridge 21 may be shaped to cut into or through the cork 6. The displacement, compression, or penetration of the cork 6 by the front penetrator 11 forms a primary penetration cavity 23 aligned along the rotational axis 25. In preferred embodiments, the primary penetration cavity 23 is in a form similar to the shaft 20 and generally referred to as cylindrically shaped. The cylindrical shape is understood to include the helical features imposed onto the cork 6 by the helical ridge 21. The cylindrical shape may include non-tapered feature(s) and/or tapered feature (s). The diameter of the primary penetration cavity 23 is referred to as the primary cavity width 24 which is at least the shaft diameter 17 in preferred embodiments.

Figure 6A:
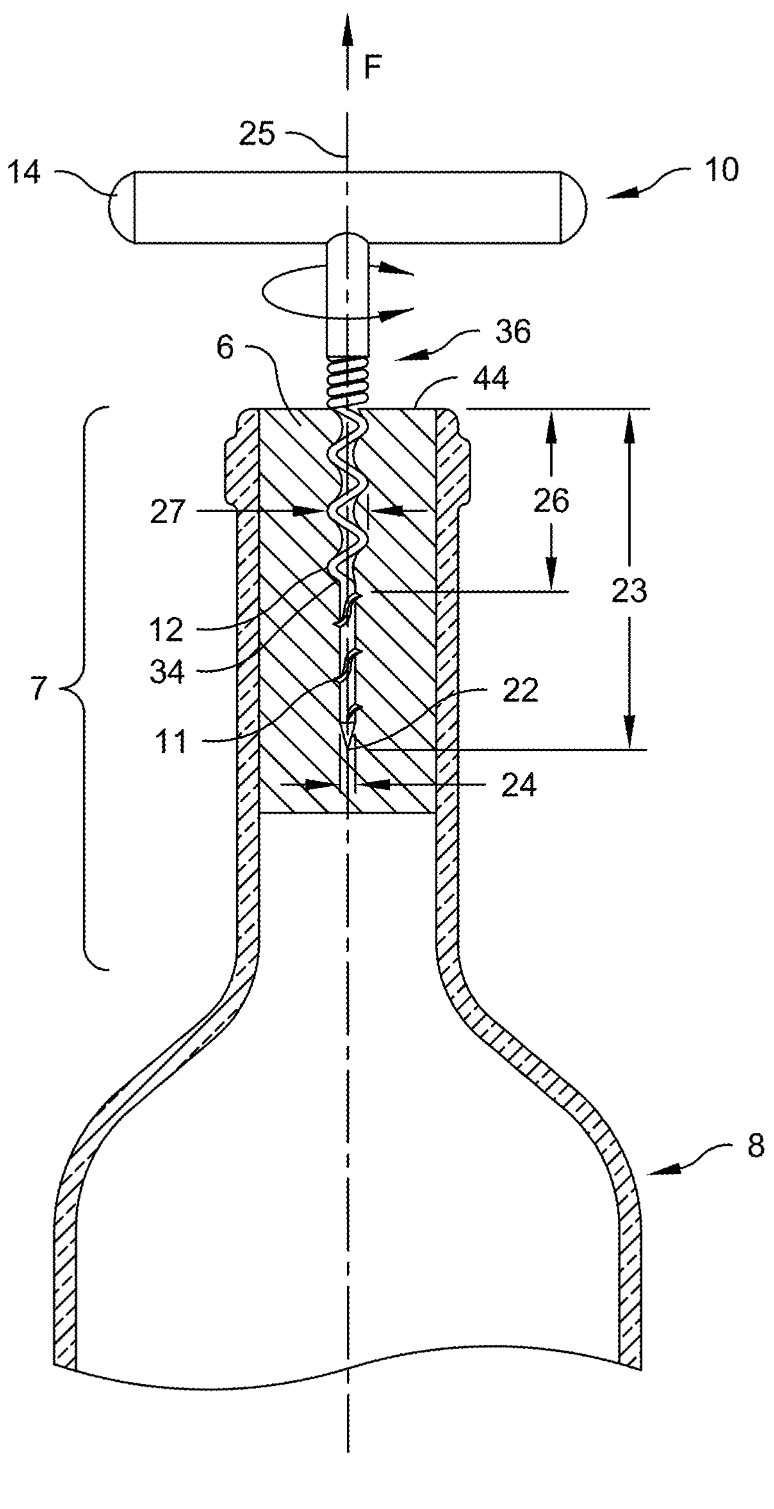

Referring now to FIG. 6*a*, the front penetrator 11 continues to bore into the cork 6 while the rear penetrator 12 enters and bores into the cork 6 as the axially aligned tandem penetrator 36 is rotated via the mechanism 14 of the corkscrew 10 about the rotational axis 25. The primary penetration cavity 23 extends from the top surface 44 of the cork 6 to the tip 22 of the front penetrator 11. The rear penetrator 12 forms a secondary penetration cavity 26 at contact with the cork 6 between the top surface 44 and generally at the interface between the front penetrator 11 and the rear penetrator 12. The primary penetration cavity 23 and the secondary penetration cavity 26 are interconnected, that is connected with each other so that they are joined. It is understood that the interconnectedness allows a portion of the axially aligned tandem penetrator 36 to reside within each of the primary penetration cavity 23 and the secondary penetration cavity 26.

Figure 8A:
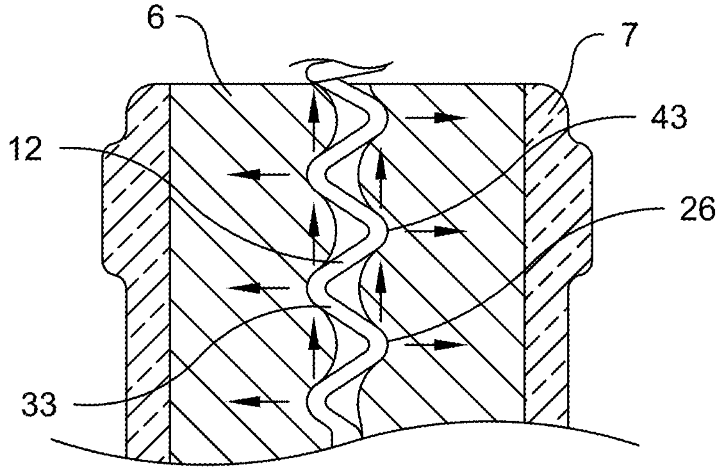

Referring now to FIGS. 6*a* and 8*a*, the rear penetrator 12 contactingly interacts with the cork 6 to form the secondary penetration cavity 26 by widening a portion of the primary penetration cavity 23. The secondary cavity width 27 of the secondary penetration cavity 26 is wider than the primary cavity width 24. The secondary penetration cavity 26 may include non-tapered feature(s) and/or tapered feature(s) formed by the front penetrator 11 and/or the rear penetrator 12. In preferred embodiments, the widening outwardly expands the primary penetration cavity 23 so that the secondary penetration cavity 26 is in the form of a helical groove 43 extending outward from the original primary penetration cavity 23; although, other shapes are possible. The widening may be the result of outwardly compressing, outwardly displacing, and/or penetrating the cork 6 at contact with the rear penetrator 12. Displacing is understood to include movement of cork material with minimal or no compression. The widening may be less localized so as to extend to parts of the cork 6 adjacent to direct contact between the rear penetrator 12 and the cork 6 within the neck 7 of the bottle 8. In preferred embodiments, the widening does not require the helical coil 33 of the rear penetrator 12 to be fully enclosed by the cork 6, one potential benefit being reduced penetration resistance therebetween because of less surface area contact or less compression. The helical coil 33 may be shaped in part or whole so as to cut or to penetrate the cork 6. In one non-limiting example, the helical coil 33 extending adjacent the first end 34 could include a sharpened leading edge. In another non-limiting example, the helical coil 33 could include a sharpened edge along the side contacting the cork 6 when penetrating a cork 6. An extraction force (F) is applied at the mechanism 14 to remove the cork 6 after the axially aligned tandem penetrator 36 is properly positioned within the cork 6.

Figure 6B:
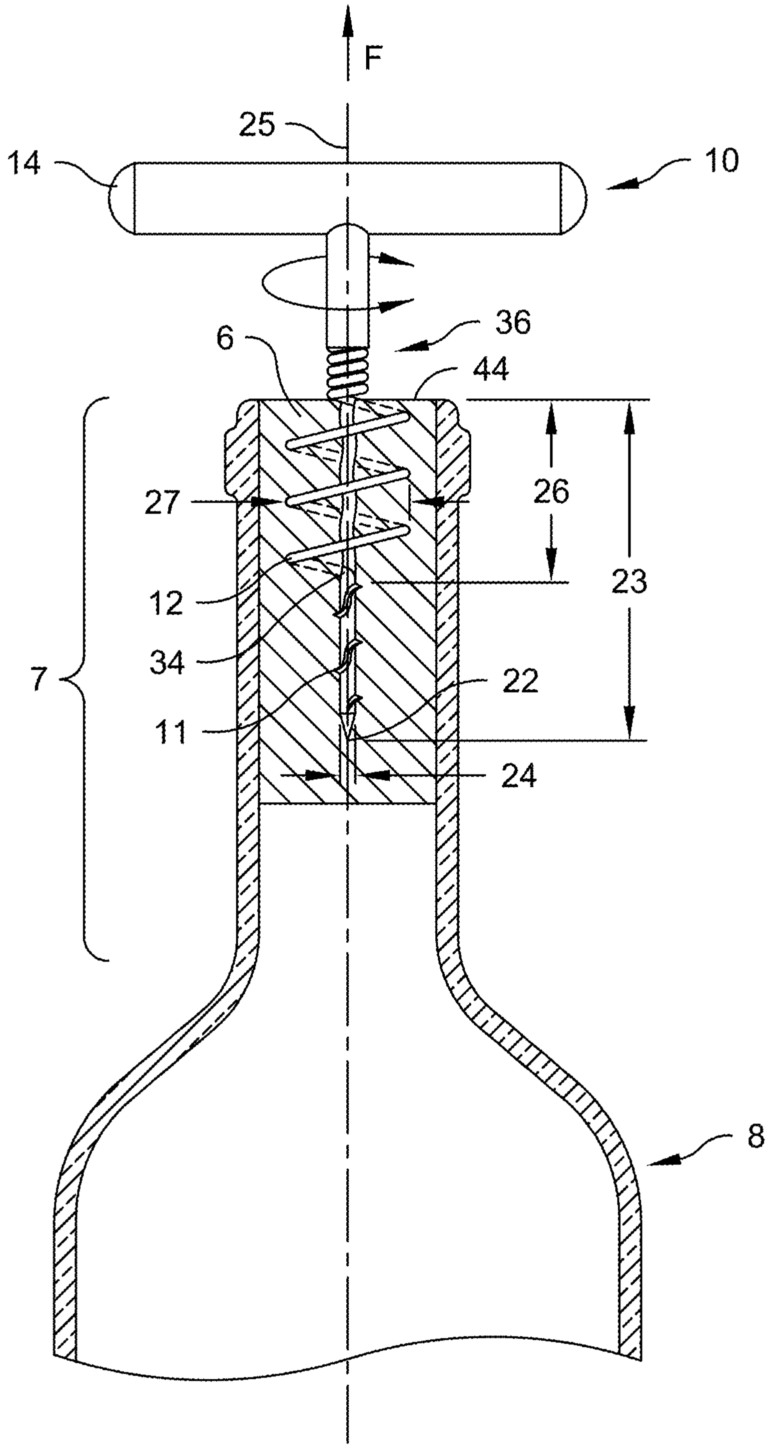

Referring now to FIG. 6*b*, the front penetrator 11 continues to bore into the cork 6 while the rear penetrator 12 enters and bores into the cork 6 as the axially aligned tandem penetrator 36 is rotated via the mechanism 14 of the corkscrew 10 about the rotational axis 25. The primary penetration cavity 23 extends from the top surface 44 of the cork 6 to the tip 22 of the front penetrator 11. The rear penetrator 12 forms a secondary penetration cavity 26 at contact with the cork 6 between the top surface 44 and generally at the interface between the front penetrator 11 and the rear penetrator 12. The primary penetration cavity 23 and the secondary penetration cavity 26 are interconnected, that is connected with each other so that they are joined. It is understood that the interconnectedness allows a portion of the axially aligned tandem penetrator 36 to reside within each of the primary penetration cavity 23 and the secondary penetration cavity 26.

Figure 8B:
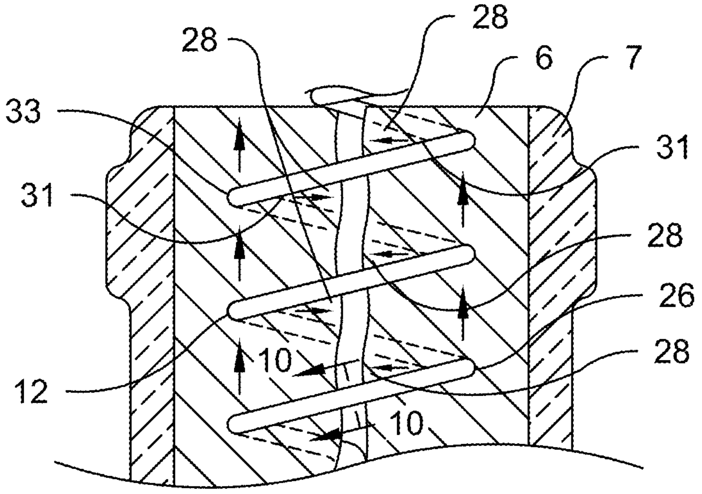

Referring now to FIGS. 6*b* and 8*b*, the rear penetrator 12 contactingly interacts with the cork 6 to form the secondary penetration cavity 26 about the primary penetration cavity 23. The secondary cavity width 27 of the secondary penetration cavity 26 is wider than the primary cavity width 24. The penetration by the rear penetrator 12 causes a portion 28 of the cork 6 to be disposed between the helical coil 33 within the secondary penetration cavity 26 and the primary penetration cavity 23. In some embodiments, the helical coil 33 at the inward side 31 may displace the portion 28 inward toward the primary penetration cavity 23. In other embodiments, the helical coil 33 may narrow the primary penetration cavity 23 via compression or penetration. The displacing or narrowing may be less localized so as to extend to parts of the cork 6 adjacent to direct contact between the rear penetrator 12 and the cork 6 within the neck 7 of the bottle 8. In preferred embodiments, the displacing or the narrowing may reduce the contact area or the compression and correspondingly reduce the penetration resistance at contact between the helical coil 33 of the rear penetrator 12 and the cork 6. The helical coil 33 may be shaped in part or whole so as to cut or to penetrate the cork 6. In one non-limiting example, the helical coil 33 extending adjacent the first end 34 could include a sharpened leading edge. In another non-limiting example, the helical coil 33 could include a sharpened edge along the side contacting the cork 6 when penetrating a cork 6. An extraction force (F) is applied at the mechanism 14 to remove the cork 6 after the axially aligned tandem penetrator 36 is properly positioned within the cork 6.

Referring now to FIGS. 7, 6*a*, and 6*b*, the extraction force (F) at the mechanism 14 is communicated to the front penetrator 11 within the primary penetration cavity 23. At least a portion of the extraction force (F) is received at the cork 6 via the helical ridge 21 by way of the shaft 20. The cork 6 separatingly moves relative to the neck 7 when the total force received at the cork 6 by way of the front penetrator 11 and/or the rear penetrator 12 exceeds the force(s) maintaining the cork 6 within the neck 7.

Referring now to FIGS. 8*a*, 8*b*, 6*a*, and 6*b*, the extraction force (F) at the mechanism 14 is communicated to the rear penetrator 12 within the secondary penetration cavity 26. At least a portion of the extraction force (F) is received at the cork 6 via the helical coil 33. The cork 6 separatingly moves relative to the neck 7 when the total force received at the cork 6 by way of the front penetrator 11 and/or the rear penetrator 12 exceeds the force(s) maintaining the cork 6 within the neck 7.

Referring now to FIGS. 9 and 10, the front penetrator 11 and/or the rear penetrator 12, in part or whole, may include an outer layer 29. In preferred embodiments, the outer layer 29 may improve penetrability by the axially aligned tandem penetrator 36 into the cork 6. In one non-limiting example, the outer layer 29 may be a friction-reducing polymer. In another non-limiting example, the outer layer 29 may be a friction-reducing ceramic. The outer layer 29 may comprise other material(s) suitable for reducing penetration resistance.

Referring now to FIG. 11, the axially aligned tandem penetrator 36 in some embodiments of a corkscrew 10 may be hingedly attached via a pin 32 to a mechanism 14 in the form of a handle, the latter permitting rotation about the rotational axis 25. The hinged arrangement may allow the axially aligned tandem penetrator 36 to rotate about an axis 37 through the pin 32. The front penetrator 11 and the rear penetrator 12 of the axially aligned tandem penetrator 36 could be attached via the pin 32 or other suitable arrangement either directly to the handle at the rear penetrator 12 or indirectly to the handle at an optional shank 13, the latter illustrated in FIG. 11. The mechanism 14 may include a lever 30 or other similar optional element known within the art suitable for improving cork extraction performance.

Referring now to FIG. 12, the axially aligned tandem penetrator 36 in other embodiments of a corkscrew 10 may be operable via a mechanism 14 including a handle 38 and a pair of arms 39 attached to a body 42. The handle 38 could rotate the axially aligned tandem penetrator 36 about the rotational axis 25 to move the axially aligned tandem penetrator 36 into a cork 6 at the neck 7 of a bottle 8. Each arm 39 could engage a rack 40 and a pinion 41 to move the axially aligned tandem penetrator 36 opposite to motion enabled by the handle 38 so that the extraction force (F) removes a cork 6 from a neck 7 of a bottle 8.

Referring now to FIGS. 5, 6*a*, and 8*a*, the axially aligned tandem penetrator 36 and the mechanism 14 cooperate, as the front penetrator 11 enters the cork 6, to avoid lateral movement by the front penetrator 11 relative to the cork 6 as the axially aligned tandem penetrator 36 is rotated via the mechanism 14 about the rotational axis 25. The primary penetration cavity 23 is formed within the cork 6 via the front penetrator 11 as the axially aligned tandem penetrator 36 is rotated via the mechanism 14. The primary penetration cavity 23 is widened by the rear penetrator 12 to form the secondary penetration cavity 26 within the cork 6 as the axially aligned tandem penetrator 36 is rotated via the mechanism 14. The secondary penetration cavity 26 is cylindrically shaped with the helical groove 43 extending outward therefrom. The cylindrical shape may include non-tapered feature(s) and/or tapered feature(s) formed by the front penetrator 11 and/or the rear penetrator 12. The primary penetration cavity 23 and the secondary penetration cavity 26 are interconnected so that the axially aligned tandem penetrator 36 resides within each of the primary penetration cavity 23 and the secondary penetration cavity 26 before the cork 6 is extracted from the neck 7. Thereafter, the extraction force (F) is applied to the mechanism 14 and communicated to the cork 6 at contact between the helical ridge 21 and the cork 6 within the primary penetration cavity 23 and at contact between the helical coil 33 and the cork 6 within the secondary penetration cavity 26.

Referring now to FIGS. 5, 6*b*, and 8*b*, the axially aligned tandem penetrator 36 and the mechanism 14 cooperate, as the front penetrator 11 enters the cork 6, to avoid lateral movement by the front penetrator 11 relative to the cork 6 as the axially aligned tandem penetrator 36 is rotated via the mechanism 14 about the rotational axis 25. The primary penetration cavity 23 is formed within the cork 6 via the front penetrator 11 as the axially aligned tandem penetrator 36 is rotated via the mechanism 14. The primary penetration cavity 23 is cylindrically shaped. The cylindrical shape may include non-tapered feature(s) and/or tapered feature(s) formed by the front penetrator 11 and/or the rear penetrator 12. The secondary penetration cavity 26 is formed by the rear penetrator 12 within the cork 6 as the axially aligned tandem penetrator 36 is rotated via the mechanism 14. The secondary penetration cavity 26 is helically shaped. The portion 28 of the cork 6 adjacent the helical coil 33 is disposed between the primary penetration cavity 23 and the secondary penetration cavity 26. The primary penetration cavity 23 and the secondary penetration cavity 26 are interconnected so that the axially aligned tandem penetrator 36 resides within each of the primary penetration cavity 23 and the secondary penetration cavity 26 before the cork 6 is extracted from the neck 7. Thereafter, the extraction force (F) is applied to the mechanism 14 and communicated to the cork 6 at contact between the helical ridge 21 and the cork 6 within the primary penetration cavity 23 and at contact between the helical coil 33 and the cork 6 within the secondary penetration cavity 26.

While the disclosure is susceptible to various modifications and alternative constructions, certain illustrative embodiments are shown in the drawings and are described in detail herein. It should be understood, however, there is no intention to limit the disclosure to the specific embodiments disclosed, but on the contrary, the intention is to cover all modifications, alternative constructions, combinations, and equivalents falling into the spirit and scope of the disclosure.

What is claimed is:

1. An axially aligned tandem penetrator for a corkscrew capable of manually removing a cork from a neck of a bottle comprising:

(a) a front penetrator including a shaft with a shaft diameter and a helical ridge disposed about and outwardly extending from said shaft; and (b) a rear penetrator including a helical coil with an inner diameter and an outer diameter, said helical coil has a first end and a second end, said front penetrator extending at said first end, said second end adapted to secure said rear penetrator to a mechanism enabling operability of said axially aligned tandem penetrator;

wherein:

said front penetrator and said rear penetrator aligned along a rotational axis passing through said mechanism;

said axially aligned tandem penetrator and said mechanism cooperate to avoid a lateral movement by said front penetrator relative to said cork when said front penetrator enters said cork in use as said axially aligned tandem penetrator is rotated about said rotational axis;

said front penetrator forms a primary penetration cavity into said cork in use as said axially aligned tandem penetrator is rotated about said rotational axis;

said rear penetrator forms a secondary penetration cavity into said cork in use as said axially aligned tandem penetrator is rotated about said rotational axis;

said primary penetration cavity formed in part without said secondary penetration cavity and in part concurrently with said secondary penetration cavity;

said primary penetration cavity being deeper than said secondary penetration cavity;

said secondary penetration cavity being wider than said primary penetration cavity;

said primary penetration cavity and said secondary penetration cavity being interconnected so that said axially aligned tandem penetrator in use resides within each of said primary penetration cavity and said secondary penetration cavity before said cork is removed from said neck.

2. The axially aligned tandem penetrator of claim 1, wherein said rear penetrator being directly secured to said mechanism.

3. The axially aligned tandem penetrator of claim 1, wherein said rear penetrator being indirectly secured to said mechanism via a shank.

4. The axially aligned tandem penetrator of claim 1, wherein said secondary penetration cavity formed by said rear penetrator widening said primary penetration cavity, said secondary penetration cavity being cylindrically shaped with a helical groove extending outward therefrom.

5. The axially aligned tandem penetrator of claim 1, wherein said secondary penetration cavity formed about said primary penetration cavity, a portion of said cork adjacent said helical coil partially separating said primary penetration cavity and said secondary penetration cavity, said primary penetration cavity formed by said shaft being cylindrically shaped, said secondary penetration cavity being helically shaped.

6. The axially aligned tandem penetrator of claim 5, wherein said portion being displaced toward said primary penetration cavity by said rear penetrator.

7. The axially aligned tandem penetrator of claim 5, wherein said primary penetration cavity being narrowed by said portion.

8. The axially aligned tandem penetrator of claim 1, wherein an extraction force at said mechanism being communicated to said cork at contact between said helical ridge and said cork within said primary penetration cavity and at contact between said helical coil and said cork within said secondary penetration cavity.

9. The axially aligned tandem penetrator of claim 1, wherein said outer diameter being larger than said shaft diameter.

10. The axially aligned tandem penetrator of claim 1, wherein said outer diameter and said inner diameter being larger than said shaft diameter.

11. The axially aligned tandem penetrator of claim 1, wherein at least one of said front penetrator or said rear penetrator includes an outer layer which reduces sliding friction at contact with said cork.

12. The axially aligned tandem penetrator of claim 1, wherein said mechanism being a handle.

13. The axially aligned tandem penetrator of claim 1, wherein said mechanism including a handle and a pair of arms.

14. The axially aligned tandem penetrator of claim 1, wherein said mechanism being a handle with said axially aligned tandem penetrator being rotatably secured to said handle adjacent a lever.

15. A method of use of an axially aligned tandem penetrator secured to a mechanism enabling said axially aligned tandem penetrator to extract a cork from a neck of a bottle comprising the steps of:

(a) entering said cork via a front penetrator of said axially aligned tandem penetrator, said axially aligned tandem penetrator and said mechanism cooperate to avoid a lateral movement by said front penetrator relative to said cork as said axially aligned tandem penetrator is rotated via said mechanism about a rotational axis passing through said mechanism;

(b) forming a primary penetration cavity within said cork via said front penetrator of said axially aligned tandem penetrator as said axially aligned tandem penetrator is rotated via said mechanism about said rotational axis, said front penetrator including a helical ridge extending outward from a shaft;

(c) widening said primary penetration cavity to form a secondary penetration cavity within said cork by a rear penetrator of said axially aligned tandem penetrator as said axially aligned tandem penetrator is rotated via said mechanism about said rotational axis, said primary penetration cavity formed in part without said secondary penetration cavity and in part concurrently with said secondary penetration cavity, said rear penetrator and said front penetrator being attached end-to-end and axially extending along said rotational axis, said rear penetrator being a helical coil, said secondary penetration cavity having a helical groove extending outward therefrom, said primary penetration cavity and said secondary penetration cavity being interconnected so that said axially aligned tandem penetrator resides within each of said primary penetration cavity and said secondary penetration cavity before said cork is extracted from said neck;

(d) applying an extraction force to said mechanism; and (e) communicating said extraction force from said mechanism to said cork at contact between said helical ridge and said cork within said primary penetration cavity and at contact between said helical coil and said cork within said secondary penetration cavity.

16. The method of claim 15, wherein said cork disposed about said primary penetration cavity being compressed outwardly by said rear penetrator to form said helical groove in said widening step.

17. The method of claim 15, wherein said cork disposed about said primary penetration cavity being displaced outwardly by said rear penetrator to form said helical groove in said widening step.

18. The method of claim 15, wherein said cork disposed about said primary penetration cavity being penetrated by said rear penetrator to form said helical groove in said widening step.

19. A method of use of an axially aligned tandem penetrator secured to a mechanism enabling said axially aligned tandem penetrator to extract a cork from a neck of a bottle comprising the steps of:

(a) entering said cork via a front penetrator of said axially aligned tandem penetrator, said axially aligned tandem penetrator and said mechanism cooperate to avoid a lateral movement by said front penetrator relative to said cork as said axially aligned tandem penetrator is rotated via said mechanism about a rotational axis passing through said mechanism;

(b) forming a primary penetration cavity within said cork via said front penetrator of said axially aligned tandem penetrator as said axially aligned tandem penetrator is rotated via said mechanism about said rotational axis, said front penetrator including a helical ridge extending outward from a shaft;

(c) forming a secondary penetration cavity within said cork via a rear penetrator of said axially aligned tandem penetrator as said axially aligned tandem penetrator is rotated via said mechanism about said rotational axis, said primary penetration cavity formed in part without said secondary penetration cavity and in part concurrently with said secondary penetration cavity, said rear penetrator and said front penetrator being attached end-to-end and axially extending along said rotational axis, said rear penetrator being a helical coil, said secondary penetration cavity being helically shaped, a portion of said cork adjacent said helical coil disposed between said primary penetration cavity and said secondary penetration, said primary penetration cavity and said secondary penetration cavity being interconnected so that said axially aligned tandem penetrator resides within each of said primary penetration cavity and said secondary penetration cavity before said cork is extracted from said neck;

(d) applying an extraction force to said mechanism; and (e) communicating said extraction force from said mechanism to said cork at contact between said helical ridge and said cork within said primary penetration cavity and at contact between said helical coil and said cork within said secondary penetration cavity.

20. The method of claim 19, further comprising the step of:

(f) displacing said portion toward said primary penetration cavity by said rear penetrator during said forming step of said secondary penetration cavity.

21. The method of claim 19, further comprising the step of:

(f) narrowing said primary penetration cavity adjacent said secondary penetration cavity during said forming step of said secondary penetration cavity.

* * * * *